March 24, 1953  G. S. PERKINS  2,632,421
ECCENTRIC CRANK LINKAGE
Filed Dec. 11, 1945

INVENTOR
GERALD S. PERKINS
BY
*M. O. Hayes*

ATTORNEY

Patented Mar. 24, 1953

2,632,421

UNITED STATES PATENT OFFICE 2,632,421

ECCENTRIC CRANK LINKAGE

Gerald S. Perkins, Azusa, Calif., assignor, by mesne assignments, to the United States of America as represented by the Secretary of the Navy Application December 11, 1945, Serial No. 634,299

4 Claims. (Cl. 116—129)

This invention relates to an eccentric crank linkage, and more particularly to such a linkage adaptable to use for expanding an indicator dial reading about its zero point.

In some indicator applications, it is desirable to convert linear shaft rotation to a non-linear indication on a center-zero scale, with the non-linearity resulting in greatest expansion around the zero point. An example of this is a navigational "left-right" or yaw indicator, showing a ship's heading relative to its desired course.

Accordingly, one object of this invention is to provide a center-zero indicator with an expanded scale about the zero point.

Another object is to provide an expanded center-zero scale indicator with no limits of operation in that continuous rotation of the dial pointer in either direction is possible.

Another object is to provide a means for converting a linear shaft rotation into a non-linear rotation.

Still another object is to provide an eccentric crank linkage to expand a center-zero indicator dial reading about its zero point.

Other and further objects will appear during the course of the following description when taken with the accompanying drawings in which.

Figure 1:
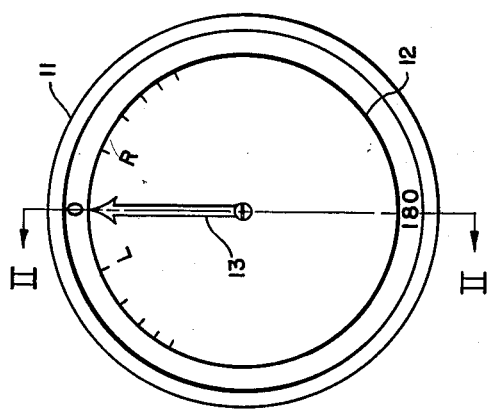
Fig. 1 shows a front view of a navigational "left-right" or yaw indicator utilizing one embodiment of this invention.

In Fig. 1 the front view of the yaw indicator shows a housing 11 enclosing circular dial 12 and indicator needle 13 pivoted at one end. As illustrated, the dial scale units are expanded about the zero point of the center-zero scale.

Figure 2:
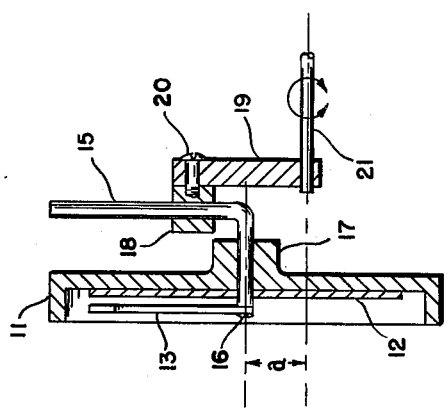
Fig. 2 shows a generally cross-sectional view through center lines II—II of Figs. 1 and 3.

Fig. 2 shows in detail the mechanism by which this expansion about the zero point is obtained. One arm of an L-shaped rod 15 extends through the center of housing 11 and has secured to its end needle 13, as by a machine screw 16. The central portion of housing 11 is enlarged into a hub, as at 17, around the hole through which rod 15 extends to provide a larger bearing surface. The other arm of rod 15 is slidably attached to guide 18, which guide is attached to an arm 19 by machine screw 20. Only the portion of screw 20 which fits into guide 18 is threaded, so the hole in arm 19 through which screw 20 extends provides a bearing surface. Screw 20 and this bearing surface thus provide a rotating joint. The other end of arm 19 is drilled to receive rotatable shaft 21, to which it is rigidly fastened by any suitable means.

Figure 3:
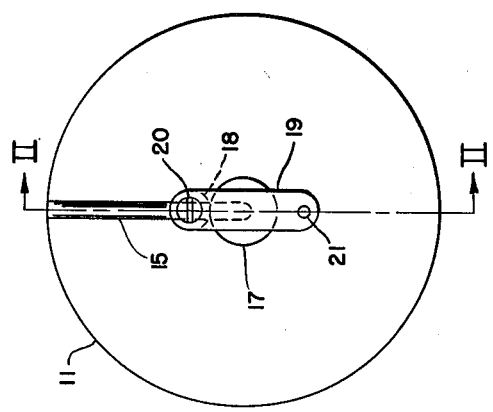
Fig. 3 shows a back view of the indicator shown in Fig. 1.

Fig. 3 shows in another view the way in which the component parts are disposed. As shaft 21 connected to the desired control mechanism rotates in either direction, arm 19 rotates in the same direction through the same angle, carrying with it guide 18. Guide 18 slides along rod 15, causing rod 15 to rotate in hub 17 through a greater angle than shaft 21 turns, and since needle 13 is rigidly secured to the end of rod 15, it rotates through the same greater angle. The ratio of the angle turned by rod 15 and needle 13 relative to the angle turned by shaft 21 is controlled by the distance $a$, shown in Fig. 2, between the center lines of shaft 21 and the portion of rod 15 disposed parallel to shaft 21. The greater the distance $a$, the greater this ratio will be. It will be noted that shaft 21 can be rotated in either direction continuously and the mechanism will follow, and also that the greatest expansion of the dial scale occurs about the zero point. In addition, if it is desirable to indicate a complete reversal of direction, from mechanical considerations of the mechanism it can be seen that the 180 degree position of needle 13 and shaft 15 corresponds exactly to the 180 degree position of shaft 21, in spite of the expansion elsewhere on the dial scale.

While a particular embodiment of this invention has been described as required by the patent statutes, the principles of this invention are broader in ways which will be apparent to those skilled in the art. The scope of the invention is defined in the following claims.

What is claimed is:

1. Apparatus for indicating comparatively small angular displacements of a rotatable shaft from a predetermined position comprising an indicating needle, an indicating dial having calibrated markings thereon and a substantially central bearing, an L-shaped rod having one arm thereof rotatably disposed within and extending through said bearing, said indicating needle being rigidly attached to the end of said arm extending through said bearing and being operable over the face of said dial in proximate relation with said calibrated markings, a guide slidably fitted over the other arm of said L-shaped rod, and a member pivotally attached at one end thereof to said guide for rotation about an axis normal to said last-mentioned arm and rigidly secured at its other end to said rotatable shaft, said member extending radially of said rotatable shaft, the axis of said dial bearing being disposed parallel to and offset from the axis of said rotatable shaft, whereby for a comparatively small angular range of rotation about said predetermined position, the indicating needle angular rotation is substantially greater than the shaft angular rotation, said indicating dial markings being calibrated in terms of the angular rotation of said shaft.

2. Apparatus for transmitting angular motion from a rotatable shaft comprising, an L-shaped rod having a first arm journaled for rotation about an axis parallel to and offset from the axis of said rotatable shaft, a member rigidly secured to and extending perpendicularly from said rotatable shaft, and a guide formed with a bore therein slidably fitted upon the second arm of said L-shaped rod, said guide being supported upon said member for rotation about an axis parallel to said rotatable shaft.

3. Apparatus as in claim 2 and including a dial having markings thereon, said dial being fitted over said first arm, and an indicating needle attached to the end of said first arm and operable over the face of said dial in proximate relation with said markings.

4. Apparatus for indicating the angular displacement of a rotatable shaft from a predetermined position comprising, a scale carrying structure having a bearing formed therein on an axis substantially parallel to and offset from said rotatable shaft, an L-shaped rod having one arm rotatably extending through said bearing, a link radially extending from said rotatable shaft and rigidly joined thereto, motion coupling means rotatably attached to said link and slidably fitted to the other arm of said L-shaped rod, said coupling means being offset from both said rotatable shaft and said arm extending through said bearing, and indicating means secured to said arm extending through said bearing and operatively associated with said scale.

GERALD S. PERKINS.

REFERENCES CITED

The following references are of record in the file of this patent:

UNITED STATES PATENTS

| Number | Name | Date |
|---|---|---|
| 1,115,000 | Martin | Oct. 27, 1914 |
| 1,810,355 | Kingsford et al. | June 16, 1931 |

FOREIGN PATENTS

| Number | Country | Date |
|---|---|---|
| 636,005 | France | Jan. 6, 1928 |